(12) United States Patent
Weiss et al.

(10) Patent No.: US 11,951,905 B1
(45) Date of Patent: Apr. 9, 2024

(54) FIBER-OPTIC WITH PIEZOELECTRIC ACTUATED PROJECTION DISPLAY

(71) Applicant: GM Global Technology Operations LLC, Detroit, MI (US)

(72) Inventors: John P. Weiss, Shelby Township, MI (US); Manoj Sharma, Troy, MI (US); Joseph F. Szczerba, Grand Blanc, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/357,697

(22) Filed: Jul. 24, 2023

(51) Int. Cl.
*B60Q 3/62* (2017.01)
*B60Q 3/20* (2017.01)
*B60Q 3/64* (2017.01)
*F21V 8/00* (2006.01)
*G02B 26/10* (2006.01)

(52) U.S. Cl.
CPC ............... *B60Q 3/64* (2017.02); *B60Q 3/20* (2017.02); *G02B 6/0006* (2013.01); *G02B 6/0008* (2013.01); *G02B 26/103* (2013.01)

(58) Field of Classification Search
CPC .... B60Q 3/62; B60Q 3/64; B60Q 3/66; F21V 2200/10; F21V 2200/13; G02B 6/0005; G02B 6/0006; G02B 6/0008
See application file for complete search history.

(56) References Cited

U.S. PATENT DOCUMENTS 4,930,049 A * 5/1990 Davenport .......... B60R 16/0315
362/23.18
10,222,529 B1 * 3/2019 Cohoon ................. G02B 6/001

* cited by examiner

*Primary Examiner* — Sean P Gramling
(74) *Attorney, Agent, or Firm* — Vivacqua Crane PLLC

(57) ABSTRACT

A display system for a vehicle includes a light source configured to emit a light and a fiber-optic cable coupled to the light source. The fiber-optic cable has a first fiber end and a second fiber end opposite the first fiber end. The first fiber end is coupled to the light source. The second fiber end is attached to a vehicle body of a vehicle. The display system includes a piezoelectric actuator coupled to the fiber-optic cable end adjacent to the second fiber end. The piezoelectric actuator is actuated to vibrate the second fiber end of the fiber-optic cable to project an image on the vehicle body adjacent the second fiber end while the light source is activated.

20 Claims, 3 Drawing Sheets

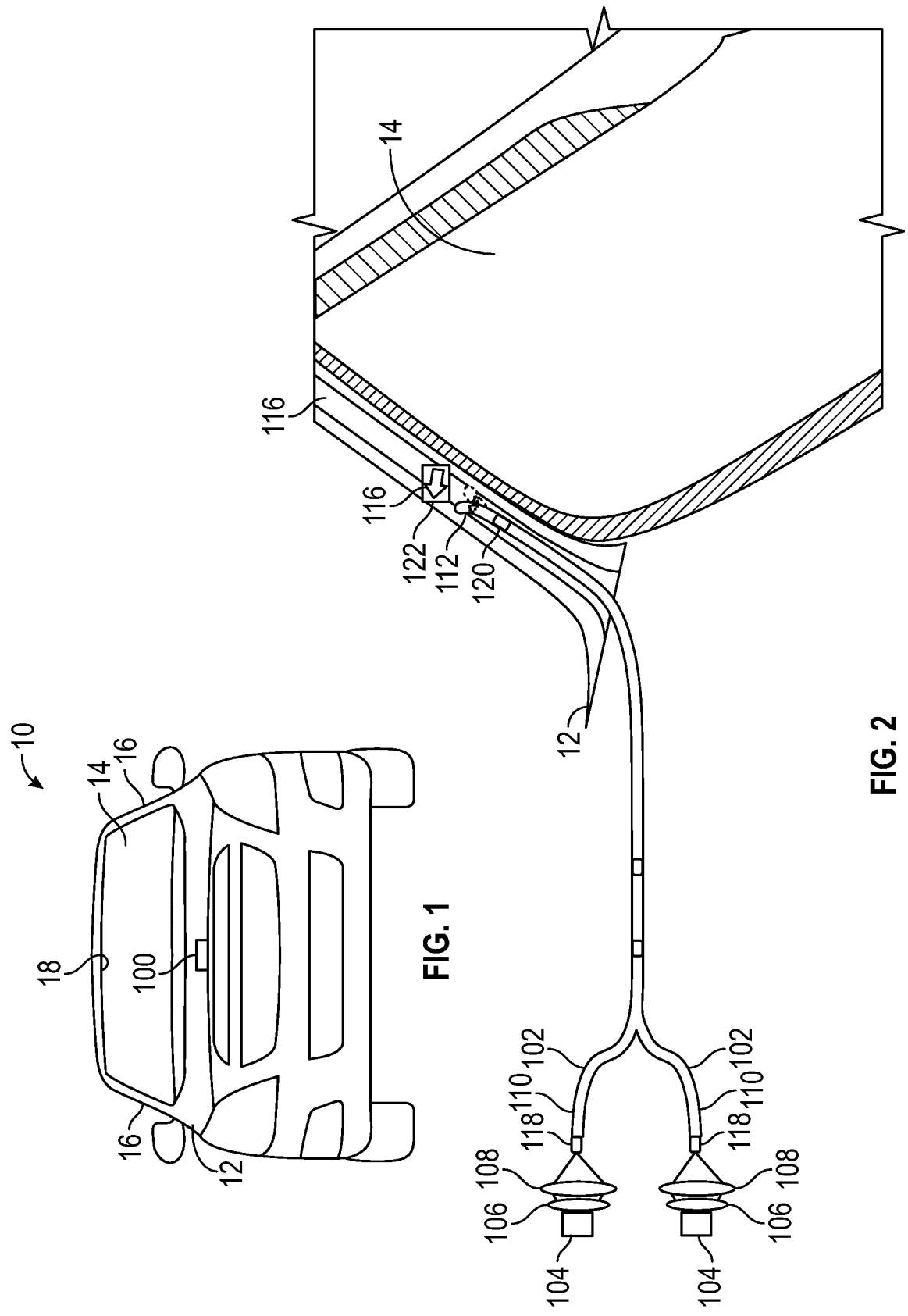

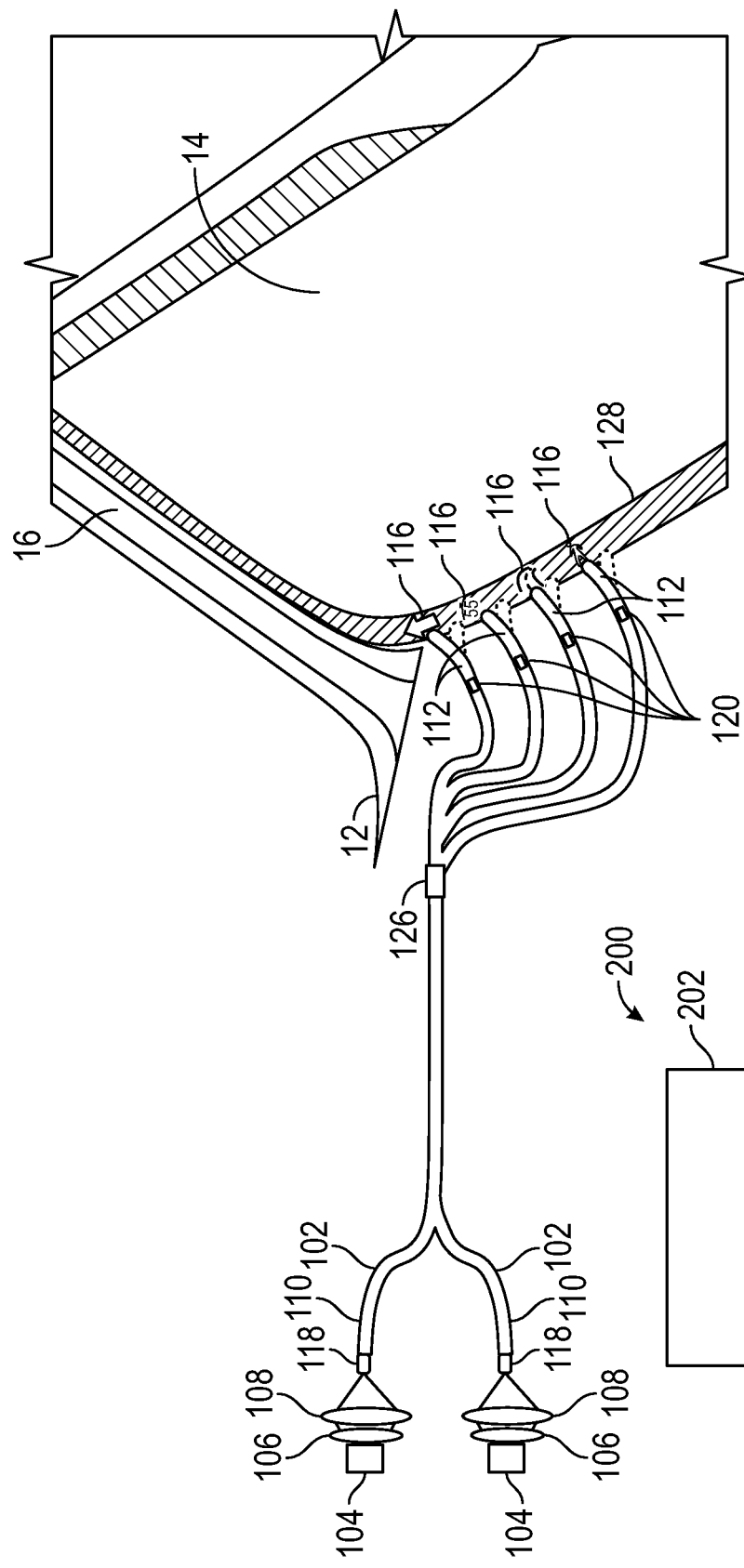
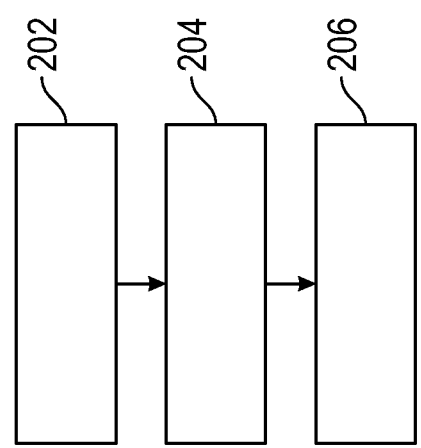
FIG. 4
FIG. 5

US 11,951,905 B1

FIBER-OPTIC WITH PIEZOELECTRIC ACTUATED PROJECTION DISPLAY

INTRODUCTION

The present disclosure relates to displays and, more specifically, to a projection display including fiber-optic cables and a piezoelectric actuator.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles include display for presenting information to the vehicle occupant. However, due to the size of most displays, it may be challenging to present images projected by the displays at the most desirable location relative to the vehicle occupant.

SUMMARY

The present disclosure describes a display system for a vehicle. The display system also includes a light source configured to emit a light and a fiber-optic cable coupled to the light source. The fiber-optic cable has a first fiber end and a second fiber end opposite the first fiber end. The first fiber end is coupled to the light source, and the second fiber end is attached to a vehicle body of a vehicle. The display system includes a piezoelectric actuator coupled to the fiber-optic cable end adjacent to the second fiber end. The piezoelectric actuator is actuated to vibrate the second fiber end of the fiber-optic cable to project an image on the vehicle body adjacent the second fiber end while the light source is activated.

Implementations may include one or more of the following features. The light source may be a light-emitting diode (LED) array. The BP filter is positioned to filter the light emitted by the led array. The focusing lens is positioned to focus the light filtered by the bp filter. The display system may include an optical fiber combiner coupling the focusing lens to the first fiber end of the fiber-optic cable. The vehicle includes a windshield. The vehicle body includes an A-pillar. The A-pillar supports the windshield. The second fiber end of the fiber-optic cable is directly attached to the a-pillar to project the image on the a-pillar when the light source is activated and the piezoelectric actuator is actuated. The vehicle body includes a headliner. The second fiber end of the fiber-optic cable is directly attached to the headliner to project the image on the headliner when the light source is activated and the piezoelectric actuator is actuated. The windshield includes a blackout region. The second fiber end of the fiber-optic cable is attached to the vehicle body at a location adjacent to the blackout region of the windshield to project the image on the blackout region of the windshield when the light source is activated and the piezoelectric actuator is actuated. The vehicle includes a phosphor array on the vehicle body. The phosphor array is excited to create the image when the light is emitted on the phosphor array.

The present disclosure also describes a vehicle. The vehicle includes a vehicle body and the display system described above.

The present disclosure also describes a method for projecting an image on a vehicle body of a vehicle. The method also includes emitting light using a light source, transporting the light with a fiber-optic cable from a first fiber end of the fiber-optic cable to a second fiber end of the fiber-optic cable, and activating a piezoelectric actuator to project an image on the vehicle body.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 1 is a schematic front view of a vehicle including a display system in accordance with an aspect of the present disclosure;

FIG. 2 is a schematic perspective view of a display system in accordance with an aspect of the present disclosure;

FIG. 4 is a schematic perspective view of a display system in accordance with yet another aspect of the present disclosure; and FIG. 5 is a method for using the display system described in the present disclosure.

DETAILED DESCRIPTION

Figure 3:
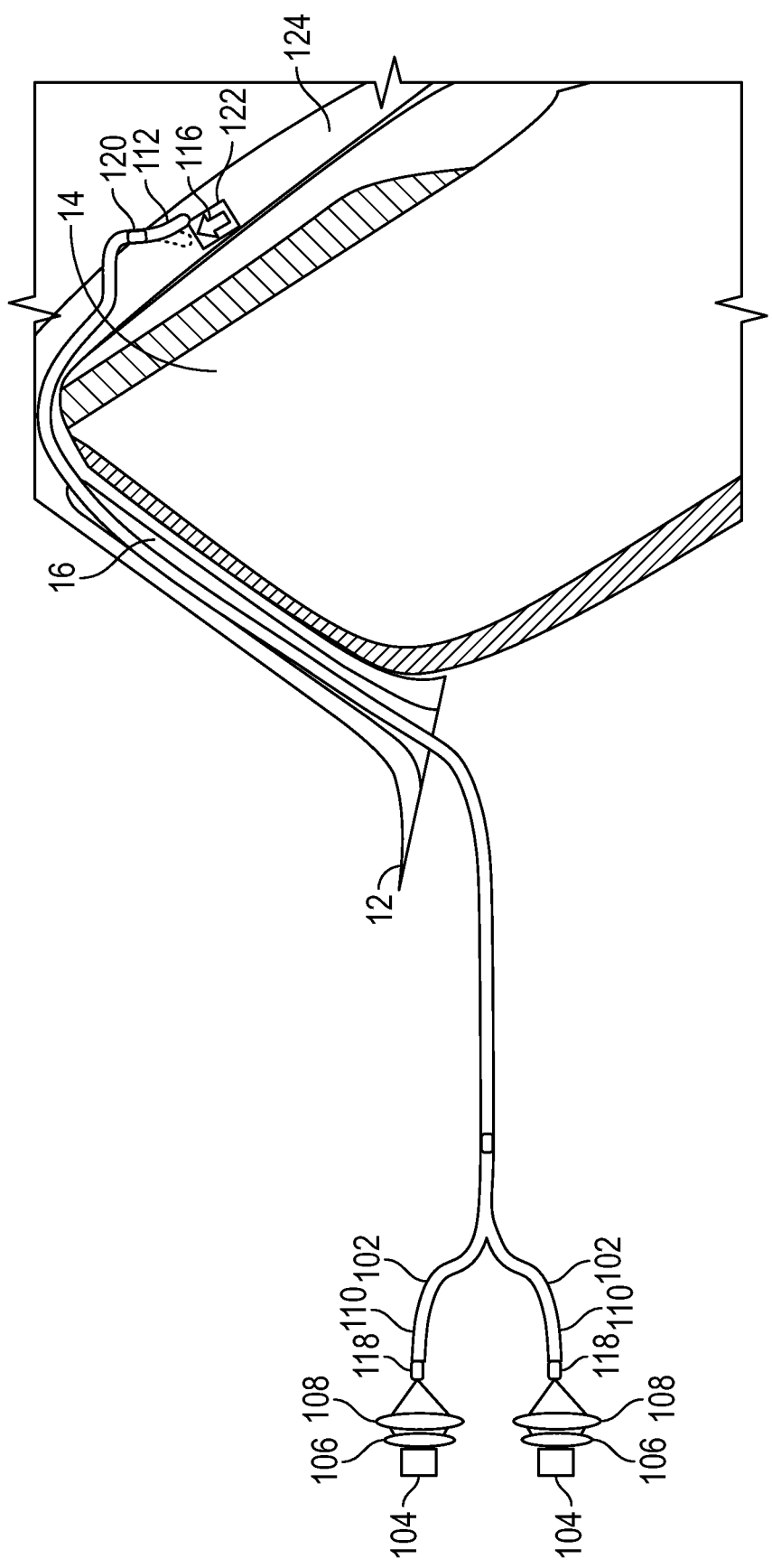
FIG. 3 is a schematic perspective view of a display system in accordance with another aspect of the present disclosure.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 including a vehicle body 12 and a windshield 14. The vehicle body 12 supports the windshield 14 and includes one or more A-pillars 16. The A-pillars are configured to support the windshield 14. The vehicle body 12 further includes a headliner 18. Although the vehicle 10 is shown as a sedan, it is envisioned that that vehicle 10 may be another type of vehicle, such as a pickup truck, a coupe, a sport utility vehicle (SUVs), a recreational vehicle (RVs), etc. The vehicle 10 also includes a display system 100 supported by the vehicle body 12.

With reference to FIG. 2, the display system 100 is configured as a vector graphics projector (VGP) and can therefore generate vector graphics. The display system 100 includes one or more fiber-optic cables 102 for carrying light. The fiber-optic cables 102 may be flexible and long enough to facilitate very small packaging and placement of the display system 100 in the vehicle 10. As a non-limiting example, at least one of the fiber-optic cables 102 may be between ten and twenty feet long. The display system 100 further includes one or more light source 104 in optical communication with the fiber-optic cables 102. At least one of the light sources 104 may be configured as a light-emitting diode (LED) array to maximize the life of the light source 104. Due to the length of the fiber-optic cables 102 (e.g., between ten and twenty feet), the light sources 104 may be positioned far from the display surface to optimize automotive package. The display system 100 doesn't require a projection system directly in front of the windshield and the whole projector system can be mounted under seats, under instrument panel or any hidden space. The display system 100 will eliminate the requirements of occupying interior space of the vehicle 10.

With continued reference to FIG. 2, the display system 100 also includes one or more bandpass (BP) filters 106 in optical communication with the light sources 104. Each BP filter 106 is positioned downstream of each light source 104 to filter the light emitted to light sources 104. As a non-limiting example, at least one of the BP filters 106 may be absorptive BP filter that absorbs unwanted light. The BP filters 106 may include multiple layers of dielectric coatings applied to a substrate. Further, the BP filters 106 may include spectral and absorption filters that are produced by a combination of lamination, cemented layers, and thin film coatings.

The display system 100 further includes one or more focusing lens 108 to focus the light emitted by the light sources 10 into one or more fiber-optic cables 102. The focusing lens 108 are therefore in optical communication with the light sources 104 and the BP filters 106. Each fiber-optic cable 102 is positioned downstream of one of the BP filters 106 to focus the light filtered by the BP filter 106.

Each fiber-optic cable 102 has a first fiber end 110 and a second fiber end 112 opposite to the first fiber end 110. The first fiber end 110 is optically coupled to the light source 104, whereas the second fiber end 112 is attached to the vehicle body 12. Accordingly, the first fiber end 110 is closer to the light source 104 than the second fiber end 112 to allow the light to be transported from the light source 104 to the desired location in the vehicle body 12. The second fiber end 112 may be directly attached to the vehicle body 12 to facilitate projection of an image 116 on the vehicle body 12.

The display system 100 also includes one or more optical fiber combiners 118 that utilizes optical fiber precision fusion technology to maximize the coupling of optical energy from the transmitting optical fiber to the receiving optical fiber, while minimizing any impact on the display system 100 from its presence in the optical path. As a non-limiting example, the optical fiber combiners 118 may be pump combiners that are configured for sending pump and signal light into the fiber-optic cable 104. For this reason, the optical fiber combiner 118 is positioned between the focusing lens 108 and the first fiber end 110 of the fiber-optic fiber 104.

The display system 100 includes a piezoelectric actuator 120 coupled to the fiber-optic cables 104 at a location adjacent to the second fiber end 112. The piezoelectric actuator 120 is controlled using an algorithm to create/project required images. The piezoelectric actuator 120 is actuated to vibrate the second fiber end 112 of the fiber-optic cables 102 to project the image 116 on the vehicle body 12 at a location adjacent the second fiber end 112 while the light source 104 is activated. For example, as shown in FIG. 2, the second fiber end 112 of the fiber-optic cables 104 may be directly attached to at least one of the A-pillars 16 of the vehicle body 12 to project the image 116 on the A-pillar 16 when the light source 104 is activated and the piezoelectric actuator 120 is actuated. The vehicle body 12 includes a phosphor array 122 disposed on a surface of the vehicle body 12. The phosphor array 122 may be configured as a film and can be excited to create the image when the light is emitted on the phosphor array 122. The display system 100 uses the fiber-optic cables 102 with the piezoelectric actuator 120 at the second fiber end 112 is used to generate vector graphics (e.g., image 116) for a small automotive display.

With reference to FIG. 3, in the display system 100, the second fiber ends 112 of the fiber-optic cable 102 are directly attached to a headliner 124 of the vehicle body 12 to project the image 116 on the headliner 124 when the light sources 104 are activated and the piezoelectric actuator 120 is actuated.

With reference to FIG. 4, the display system 100 includes a splitter 126 to split the light. The windshield 14 includes a blackout region 128 that is darker than the rest of the windshield 14. The second fiber ends 112 of the fiber-optic cables 102 are attached to the vehicle body 12 at a location adjacent to the blackout region 128 of the windshield 14 to project the images 116 on the blackout region 128 of the windshield 14 when the light sources 104 are activated and the piezoelectric actuators 120 are actuated. Although not shown, the blackout region 128 of the windshield 14 includes the phosphor array 122. At the blackout region 128, the display system 100 can be used to project telltales. Besides the windshield 14, backlit phosphor sheets may be used to create an image. On the windshield 14, front lit sheets are used. These front lit sheets may be a phosphor-based sheet or any other sheets such as holographic grating based or liquid crystal-based sheets.

FIG. 5 is a method 200 for using the display system 100. The method 200 begins at block 202. At block 202, the light sources 102 are activated to emit a light. Then, the method 200 continues to block 204. At block 204, the light is transported with the fiber-optic cables 102 from the first fiber end 110 to the second fiber end 112 of the fiber-optic cables 102. Then, the method 200 continues to block 206. At block 204, the piezoelectric actuators 120 are activated to project the image on the vehicle body 12. Blocks 202, 204, and 204 may occur simultaneously or sequentially.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A display system for a vehicle, comprising:
a light source configured to emit a light;
a fiber-optic cable coupled to the light source, wherein the fiber-optic cable has a first fiber end and a second fiber end opposite the first fiber end, the first fiber end is coupled to the light source, and the second fiber end is attached to a vehicle body of a vehicle; and
a piezoelectric actuator coupled to the fiber-optic cable end adjacent the second fiber end, wherein the piezoelectric actuator is actuated to vibrate the second fiber end of the fiber-optic cable to project an image on the vehicle body adjacent the second fiber end while the light source is activated; and
wherein the display system minimizes in-cabin packaging.

2. The display system of claim 1, wherein the light source is a light-emitting diode (LED) array.

3. The display system of claim 2, further comprising a bandpass (BP) filter coupled to the LED array, wherein the BP filter is positioned to filter the light emitted by the LED array.

4. The display system of claim 3, further comprising a focusing lens coupled to the BP filter, wherein the focusing lens is positioned to focus the light filtered by the BP filter.

5. The display system of claim 4, further comprising an optical fiber combiner coupling the focusing lens to the first fiber end of the fiber-optic cable.

6. The display system of claim 5, wherein the vehicle includes a windshield, the vehicle body includes an A-pillar, the A-pillar supports the windshield, and the second fiber end of the fiber-optic cable is directly attached to the A-pillar to project the image on the A-pillar when the light source is activated and the piezoelectric actuator is actuated.

7. The display system of claim 5, wherein the vehicle body includes a headliner, and the second fiber end of the fiber-optic cable is directly attached to the headliner to project the image on the headliner when the light source is activated and the piezoelectric actuator is actuated.

8. The display system of claim 5, wherein the vehicle includes a windshield, the vehicle body supports the windshield, the windshield includes a blackout region, the second fiber end of the fiber-optic cable is attached to the vehicle body at a location adjacent to the blackout region of the windshield to project the image on the blackout region of the windshield when the light source is activated and the piezoelectric actuator is actuated.

9. The display system of claim 1, wherein the vehicle includes a phosphor array on the vehicle body, and the phosphor array is excited to create the image when the light is emitted on the phosphor array.

10. The display system of claim 1, wherein the display system is configured to project telltales.

11. The display system of claim 1, wherein the piezoelectric actuator is controlled using an algorithm to project the image.

12. A vehicle, comprising:
a vehicle body;
a light source configured to emit a light;
a fiber-optic cable coupled to the light source, wherein the fiber-optic cable has a first fiber end and a second fiber end opposite the first fiber end, the first fiber end is coupled to the light source, and the second fiber end is attached to a vehicle body; and
a piezoelectric actuator coupled to the fiber-optic cable end adjacent the second fiber end, wherein the piezoelectric actuator is actuated to vibrate the second fiber end of the fiber-optic cable to project an image on the vehicle body adjacent the second fiber end while the light source is activated.

13. The vehicle of claim 12, wherein the light source is a light-emitting diode (LED) array.

14. The vehicle of claim 13, further comprising a bandpass (BP) filter coupled to the LED array, wherein the BP filter is positioned to filter the light emitted by the LED array.

15. The vehicle of claim 14, further comprising a focusing lens coupled to the BP filter, wherein the focusing lens is positioned to focus the light filtered by the BP filter.

16. The vehicle of claim 15, further comprising an optical fiber combiner coupling the focusing lens to the first fiber end of the fiber-optic cable.

17. The vehicle of claim 16, wherein the vehicle includes a windshield, the vehicle body includes an A-pillar, the A-pillar supports the windshield, and the second fiber end of the fiber-optic cable is directly attached directly to the A-pillar to project the image on the A-pillar when the light source is activated and the piezoelectric actuator is actuated.

18. The vehicle of claim 17, wherein the vehicle body includes a headliner, and the second fiber end of the fiber-optic cable is directly attached to the headliner project the image on the headliner when the light source is activated and the piezoelectric actuator is actuated.

19. The vehicle of claim 18, wherein the vehicle includes a windshield, the vehicle body supports the windshield, the windshield includes a blackout region, the second fiber end of the fiber-optic cable is attached to the vehicle body at a location adjacent to the blackout region of the windshield to project the image on the blackout region of the windshield when the light source is activated and the piezoelectric actuator is actuated.

20. A method for projecting an image on a vehicle body of a vehicle, comprising:
emitting light using a light source;
transporting the light with a fiber-optic cable from a first fiber end of the fiber-optic cable to a second fiber end of the fiber-optic cable, wherein the second fiber end is adjacent the vehicle body of the vehicle; and activating a piezoelectric actuator to vibrate the second fiber end of the fiber-optic cable to project an image on the vehicle body adjacent the second fiber end.

\* \* \* \* \*